United States Patent Office 3,012,583
Patented Dec. 12, 1961

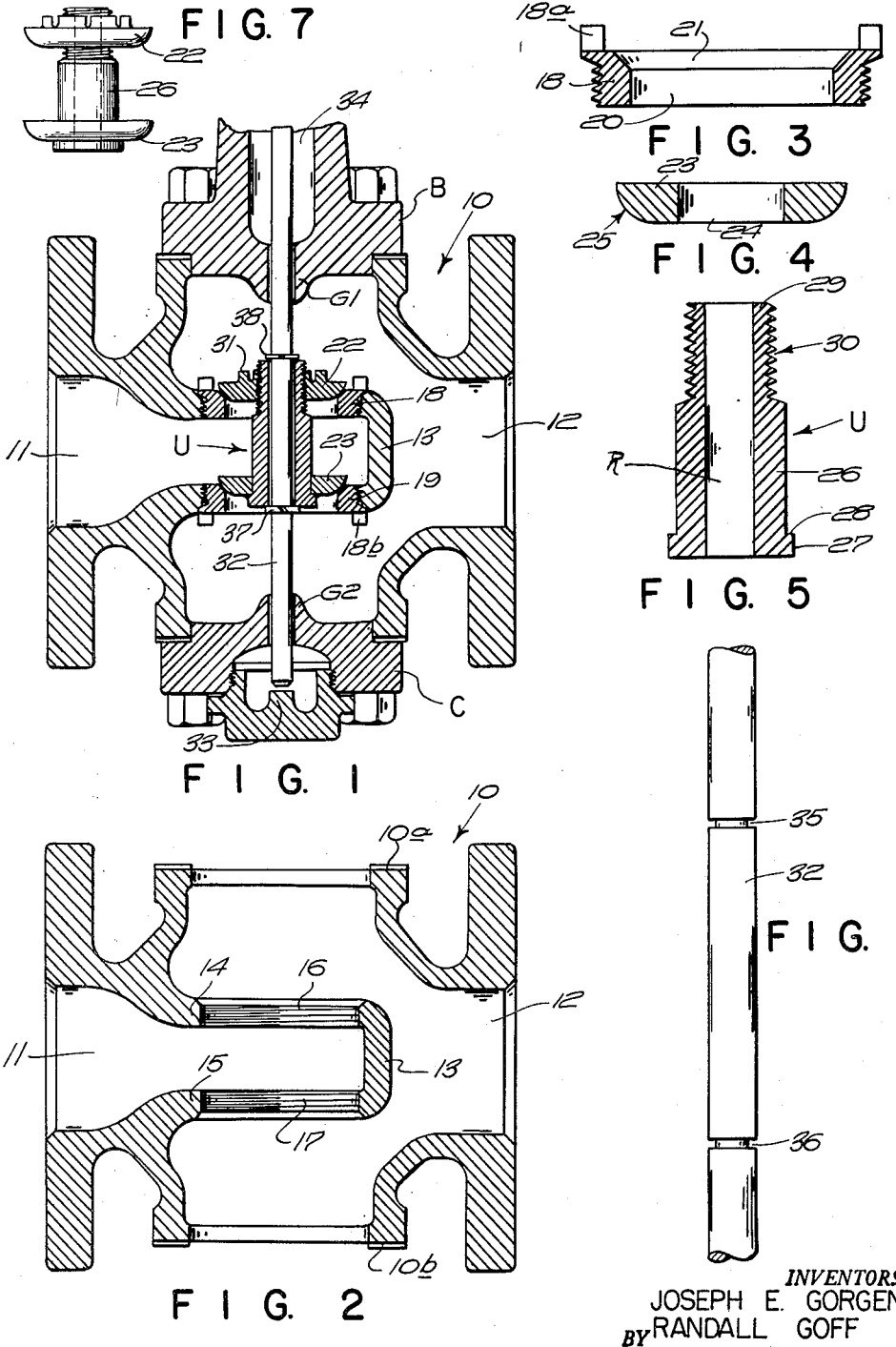

3,012,583
DOUBLE-SEATED VALVE FOR HIGH
TEMPERATURE WORK
Joseph E. Gorgens, Easton, and Randall Goff, Weston, Conn., assignors to Manning, Maxwell & Moore, Incorporated, Stratford, Conn., a corporation of New Jersey
Filed July 25, 1960, Ser. No. 44,935
1 Claim. (Cl. 137—625.34)

This invention pertains to valves, more especially to valves of the balanced type in which two coaxial valve disks, spaced apart longitudinally of an actuating stem or rod, cooperate with two corresponding coaxial valve seats for controlling fluid flow.

Such valves possess several advantages as compared with single valves, in part because by the use of two valve disks of approximately the same diameter and so arranged that the pressure fluid tends to open one and to seat the other, the force necessary to open or close the valve may be very small as compared with that required to open or close a valve having a single disk and of the same capacity as the balanced valve.

Moreover, such a duplex or balanced valve has the advantage, as compared with a single valve of the same capacity, that, in order to open the valve for the discharge of a given volume of fluid, the lift of the two valves from their seats, that is to say, the amount of motion of the actuating stem, is small as compared with the motion necessary to provide the same volume of discharge when a single valve disk is employed. A still further advantage is that when the valve must be of very great capacity, it is easier to handle and machine valve disks of relatively small diameter as compared with the handling and machining of a single valve disk of very large size.

However, from the practical standpoint, such balanced valves as heretofore constructed have certain disadvantages. Obviously, in order to obtain complete balance, both disks should present exactly the same area to the pressure fluid, but if the valve casing be of unitary construction as is usual, the introduction of the inner or lower valve disk necessitates its passage through the seat of the upper or outer valve disk and when the valve seats, as usual are machined from the metal of the valve casing itself, it is not possible to make the upper seat of the same diameter as the lower seat since, as just noted, the lower disk must be passed downwardly through the upper seat in assembling the parts. Thus, the attainment of complete balance is almost impossible when the valve seats are integral with the casing and there is always an unbalanced force acting in the direction of the larger disk.

The above difficulty may be avoided by making the valve seats as independent rings, both of the same inside diameter, which are fixed in coaxial openings in the valve body, thus permitting the lower valve to be passed through the opening intended for the upper ring before the latter is installed. Such independent seat rings are commonly employed when it is desired to provide seat surfaces which are more wear-resistant than the material of the valve body; for example, rings of stainless steel.

However, there is another problem involved in the design of balanced valves which arises when the two valve disks are fixed, at the proper distance apart, to an actuating stem, usually of steel, while the valve body is more often of cast iron. Assuming that, at the factory, the valve disks are accurately positioned on such a stem so that the room temperature at which the assembly is made both disks make leak-tight contact with the corresponding seats, it is found that, when the valve is put into use, especially in high temperature work, the material of the valve body may expand at a rate exceeding that of the stem and thus the valve seats may move apart enough so that one of the disks no longer makes leak-tight contact with its seat. Obviously, this effect becomes more pronounced as the distance between the valve seats is increased, so that a large mass of the body material intervenes between the seats. In the attempt to avoid this difficulty valve designers have been constrained to locate the seats as close together as possible, but in placing the seats close together the entrance passage is correspondingly restricted and thus the capacity of the valve is reduced below that which it would have were the seats further apart.

The present invention has for an object the provision of a valve of the balanced type of such a design that it becomes possible to use valve disks of the same effective diameter so that actual balance is attained. A further object is to provide a valve of the above type wherein two coaxial valve disks are employed, both actuated by the same stem, and wherein, although the valve seats, disks and stem may be of materials having different coefficients of thermal expansion from that of the valve body, the initial leak-tight setting of the disks is not disturbed by temperature changes to which the valves may be subjected during use. A further object is to provide a valve of the above type wherein two coaxial valve disks are actuated by the same stem, but wherein clearance is provided between the stem and disks such as to permit the valve disk to seat accurately, although the planes of the valve seats may not be accurately perpendicular to the axis of the stem. A further object is to provide a valve of this type wherein the two valves disks are mounted upon a part independent of the stem and having a coefficient of thermal expansion so nearly like that of the valve body, that expansion or contraction of the valve body will not affect the spacing of the valve disks. A further object is to provide a duplex or balanced valve wherein the valve disks are provided with spherically curved seat-engaging surfaces and the seats have conical surfaces, thereby providing a line contact between the disks and their seats and insuring a leak-tight contact even though the valve disks are not absolutely concentric with the seats. A further object is to provide means whereby the distance between the valve disks may readily be adjusted at the factory and, when once adjusted, retain the adjustment indefinitely regardless of the conditions or use.

Other and further objects and advantages will be pointed out in the following more detailed description and by reference to the accompanying drawings, wherein:

FIG. 1 is a diametrical, vertical section with parts broken away, illustrating a valve embodying the present invention and showing the two valve disks seated;

FIG. 2 is a similar view showing the valve body alone, suitably prepared for the installation of independent valve seats;

FIG. 3 is a diametrical section, to larger scale, showing one of the valve seats (the upper one) in readiness for installation in the valve body;

FIG. 4 is a diametrical section showing one of the valve disks (this being the lower disk as it is shown in FIG. 1);

FIG. 5 is a diametrical section, to larger scale than FIG. 1, showing a tubular disk-spacing spool or bushing;

FIG. 6 is a front elevation, to larger scale than FIG. 1, illustrating a desirable type of stem for actuating the valve disks; and FIG. 7 is a side elevation of a valve unit, comprising two coaxial disks mounted upon a spacer sleeve.

Referring to the drawings and particularly to FIG. 2, the numeral 10 designates the valve body, here shown as comprising an integral casting, for example, of cast iron, and shaped to define the inlet chamber 11 and the outlet or discharge chamber 12, these chambers being separated by a duplex septum 13 comprising the parallel walls 14 and 15 spaced apart and providing a space between them communicating with the inlet chamber 11. These walls 14 and 15 have coaxial circular openings whose edges are screw-threaded, as shown in 16 and 17 respectively. The body also has openings at top and bottom defined by the annular surfaces 10a and 10b respectively, the surface 10a providing a seat for the bonnet B (FIG. 1) and the surface 10b providing a seat for the bottom closure C, the bonnet and bottom closure being secured to the body of the casing by bolts or other customary attaching devices. The screw threads at 16 and 17 receive seat rings 18 and 19 (FIG. 1), respectively, the upper ring 18 being shown in detail in FIG. 3. This ring has the central axial opening 20 whose upper portion is defined by the valve seat 21, here shown as a beveled or conical surface. To facilitate the tightening of this ring in the opening in the septum wall 14, it is provided with upstanding lugs 19 designed to receive a spanner wrench or the like. The lower seat ring 19, which engages the screw thread 17, has an axial opening 20 and seat surface like that of the ring 18, but its wrench-receiving lugs 18b are directed downwardly instead of upwardly, so that the ring may be introduced from below.

Valve disks 22 and 23, respectively, cooperate with the seat surfaces of the rings 18 and 19 to close the fluid passages in the septum walls 14 and 15, it being noted that the disk 22, in opening, moves away from its seat in the direction of fluid flow while the disk 23, being located within the space between the septum walls 14 and 15, in opening, moves oppositely to the flow of fluid. In other words, the static pressure of the fluid in the inlet chamber 11 tends to unseat the disk 22 but to press the valve disk 23 against its seat. As shown more clearly in FIG. 4, the valve disk 23 has the central axial opening 24 and a peripheral surface 25 for contact with its seat, this surface 25 being spherically curved. With this arrangement, wherein the valve disk has a spherically curved seat-engaging surface, while the seat 21 which it engages has a conical face, the result is that the valve disk makes a line contact with the seat, providing a high unit pressure and even though the valve disk may not be accurately coaxial with the seat, it will still make a leak-tight contact. The two valve disks 22 and 23 are identical in shape and construction except that the valve disk 22 has internal screw threads, and upstanding lugs 31 to facilitate turning it in assembling it with a part U upon which it is mounted. This part U is a spool-like sleeve or spacer of the same material as the body of the valve or, at least, of a material having a coefficient of thermal expansion substantially like that of the body 10. This spacer sleeve U has a central axial bore R, and a hex flange 27 at its lower end which provides a shoulder 28 on which the lower disk 23 rests. Preferably, the lower disk 23 is permanently united to the sleeve or spacer U, for example, by welding. The spacer U is reduced in diameter at its upper part and slightly tapered upwardly and provided with external screw threads at 30 for engagement with the internal screw threads of the upper disk 22.

An actuating stem 32 (FIG. 6) extends through the bore of the spacer U and is arranged to slide in guideways formed in parts G¹ and G² of the bonnet B and the bottom closure C, respectively. The latter is provided with a stop 33 to limit downward motion of the stem 32. The stem extends upwardly through a bore 34 in bonnet B and may be actuated by any conventional device or means (not shown), such as is customarily employed in the actuation of a valve of this general type. The stem 32 is of a diameter slightly less than that of the bore in the spacer so as to provide clearance between it and the wall of the bore, and is provided with circumferential grooves 35 and 36 spaced apart a distance slightly exceeding the length of the spacer U.

In assembling the parts and assuming that the bonnet B and the bottom closure C have not yet been put in place, the valve seat 19 is engaged with the screw threads at 17 and tightened. The spacer U, with which the lower valve disk 23 are assembled and united, and these parts, or a unit, are then slipped down on the stem 32 until the valve disk 23 rests on the seat 19. The valve seat ring 18 is now slipped down along the stem 32 and put in place and tightened. The valve disk 22 is slipped down along the stem and is engaged with the screw threads at 30 on the spacer U and turned until it makes leak-tight contact with the seat 18. The valve disk 22 is adjusted accurately so that both valve disks make leak-tight contact with their respective seats. This is done by placing a flow meter in series with an air supply leading to the valve inlet, holding the lower disk 23 closed, and screwing the upper adjustable disk down until it also closes. The proper adjustment point is shown clearly by the flow meter which indicates a drop in flow until the seats are properly adjusted, after which continued motion of the upper disk in the same direction would cause an increase in flow, which would result from the lifting of the lower disk from its seat as a result of the excess downward motion of the upper disk after it has made contact with its seat.

The snap ring 37 is now placed in the bottom groove 36 of the stem 32 and the latter is pushed up through the bore in the part U and the second snap ring 38 is placed in the upper groove 35 of the stem. The bonnet B and the bottom closure C are then assembled with the valve body and secured in position.

The tapered screw thread at 30 provides both a locking and sealing function as well as the mechanical strength necessary to keep the valve disks properly spaced during use. Additional mechanical locking means may be provided, if desired, although not here shown. It is further contemplated that, if desired, some type of sealing compound may be applied to the screw threads so that the tightness of the joint at this point will not depend entirely upon a metal-to-metal contact.

Because both the upper disk 31 and seat ring 18 are removable, it is possible to make both valve disks of exactly the same effective diameter, since the lower disk may be passed down through the opening in the upper septum wall before the valve seat 18 is put in place, as above described, thereby providing an accurately balanced valve.

In order that the thermal expansion or contraction of the stem 32 may not affect the seating of the valve disks, the grooves 35 and 36 are spaced apart a distance slightly exceeding the length of the spacer U so that there is some lost motion axially of the valve stem between the valve unit (comprising the assembled disks 22, 23 and spacer U), and the stem. Likewise, because there is some clearance radially between the valve stem and the bore in the spacer U, any slight inaccuracy of axial alignment of the valve unit and the stem will not affect the seal between the disks and their seats.

Since the clearance space above referred to opens at its opposite ends into the discharge chamber 12, its presence does not result in leakage of the pressure fluid from the chamber 11.

While one desirable embodiment of the invention has herein been disclosed by way of example, it is to be understood that the invention is broadly inclusive of any and all modifications falling within the scope of the appended claim.

We claim:

A double-seated, balanced valve of the kind which comprises a unitary body of cast metal having inlet and outlet chambers, a septum integral with the body and which separates said chambers, said septum comprising two spaced parallel walls, the space between said walls communicating with the inlet chamber, an annular beveled valve seat defining a flow passage through each of said walls, said valve seats being coaxial and of a material which is more resistant to wear and corrosion than is the material of the valve body, means whereby the valve seats are secured in operative position in holes in the respective walls of the septum, a valve disc cooperable with each respective seat for controlling the flow of fluid therethrough, the valve discs presenting exactly equal areas to the pressure fluid within the inlet chamber, the seat-engaging surface of each valve disc being spherically curved thereby to insure a line contact between each disc and its seat even though the disc is not truly coaxial with its seat, one of the discs being within the space between the walls of the septum and the other of said discs being at the fluid-discharge side of its seat, a rigid tubular spacer sleeve coaxial with said seats, said sleeve having a radial flange near one end which constitutes a support for that disc which is located in the space between the septum walls and having an externally screw-threaded portion to which the other disc is threaded, said threaded portion of the sleeve being tapered thereby to insure retention of the assembled parts in the relative position to which they are adjusted, the spacer holding the discs in accurately coaxial relation and so spaced that they simultaneously make leak-tight contact with their respective seats, a stem for moving the spacer sleeve thereby to move the discs simultaneously and to the same amount from their seats, the stem being provided with a peripheral groove below the lower end of the spacer sleeve and another groove above the upper end of the spacer sleeve, and a snap-ring within each of said grooves providing a shoulder for limiting relative movement of the spacer sleeve and stem, characterized in that the spacer sleeve is of a material having a coefficient of thermal expansion approximately like that of the material of the valve body whereby the valve remains leak-tight regardless of variations in temperature to which the valve body is subjected; the diameter of the axial bore in the spacer sleeve exceeding the outside diameter of the stem and the sleeve being free to move radially of the stem whereby the accurate seating of the discs is unaffected by inaccuracy of axial alignment of the sleeve and stem; and the peripheral grooves in the stem being spaced apart a distance exceeding the length of the sleeve whereby thermal variation in the length of the stem does not affect the seating of the discs.

References Cited in the file of this patent

UNITED STATES PATENTS

| | | |
|---|---|---|
| 1,165,315 | Cameron | Dec. 21, 1915 |
| 1,575,834 | Hurckes | Mar. 9, 1926 |
| 1,851,016 | Skelly | Mar. 29, 1932 |
| 1,872,157 | Mastenbrook | Aug. 16, 1932 |
| 2,781,772 | Russell | Feb. 19, 1957 |

FOREIGN PATENTS

| | | |
|---|---|---|
| 559,005 | Belgium | July 31, 1957 |